C. C. WILLIAMS.
CHILD'S VEHICLE.
APPLICATION FILED NOV. 5, 1919.

1,386,827.

Patented Aug. 9, 1921.
2 SHEETS—SHEET 1.

Inventor.
Calvin C. Williams.

by Lacey & Lacey Attys.

C. C. WILLIAMS.
CHILD'S VEHICLE.
APPLICATION FILED NOV. 5, 1919.
1,386,827.
Patented Aug. 9, 1921.
2 SHEETS—SHEET 2.
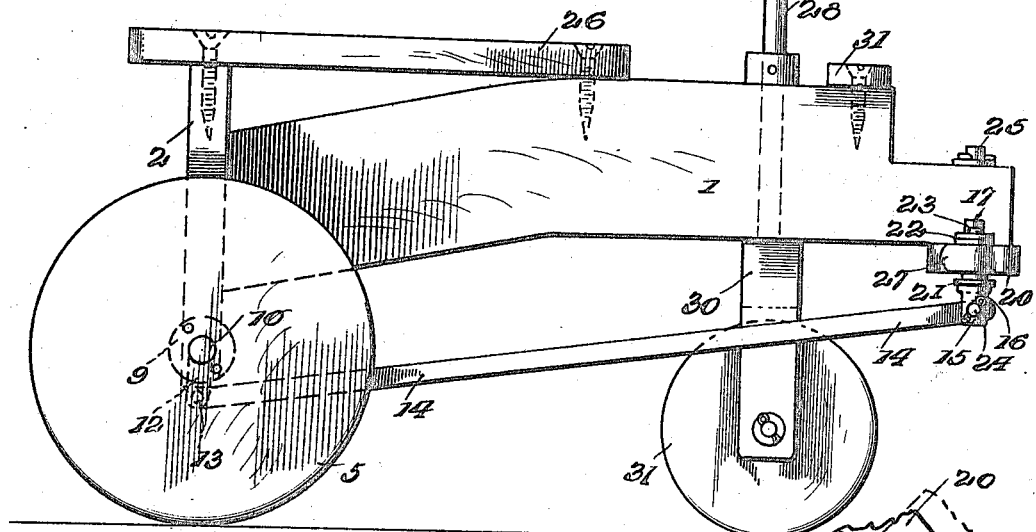
Inventor.
Calvin C. Williams.
by Lacey & Lacey, Atty's
his

UNITED STATES PATENT OFFICE.

CALVIN C. WILLIAMS, OF PHILADELPHIA, PENNSYLVANIA.

CHILD'S VEHICLE.

1,386,827.  Specification of Letters Patent.  Patented Aug. 9, 1921.

Application filed November 5, 1919. Serial No. 335,905.

*To all whom it may concern:*

Be it known that I, CALVIN C. WILLIAMS, a citizen of the United States, residing at Philadelphia, in the county of Philadelphia and State of Pennsylvania, have invented certain new and useful Improvements in Children's Vehicles, of which the following is a specification.

This invention relates to vehicles for use by children and more particularly to an improvement in the driving devices for such vehicles, and one of the objects of the invention is to provide an extremely simple and inexpensive means for imparting rotary motion to one of the supporting wheels of the vehicle and which means will be exceptionally durable and not liable to become broken or to get out of order.

Another object of the invention is to provide, in a vehicle of the class referred to above, a propelling means actuated by an oscillatory foot member so arranged that it may be most conveniently operated and in the least tiresome manner, the hands being left free for the purpose of steering the vehicle.

Another object of the invention is to so construct the propelling means for the vehicle that the operation of the same will not in any way interfere with or affect the steering of the vehicle.

In the accompanying drawings:

Fig. 3 is a detail side elevation of the vehicle;

Fig. 4 is a view partly in plan and partly in horizontal section illustrating the driving means embodying the present invention, different portions of the moving parts being shown in dotted and full lines in the said figure;

Figure 1:
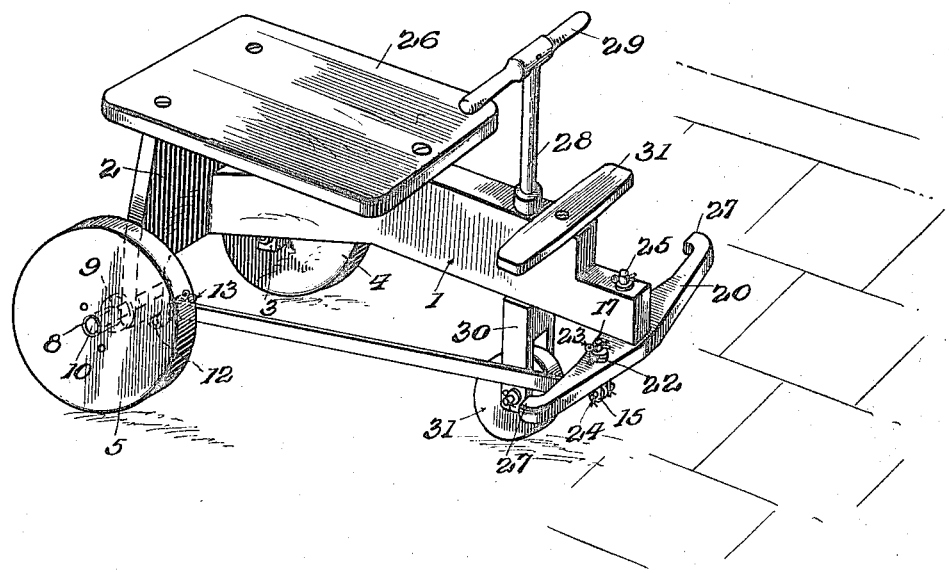
Figure 1 is a perspective view of the vehicle constructed in accordance with the present invention.
Figure 2:
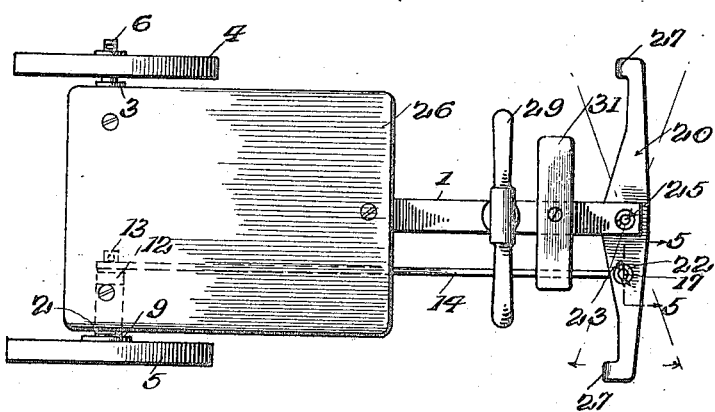
Fig. 2 is a top plan view thereof.
Figure 5:
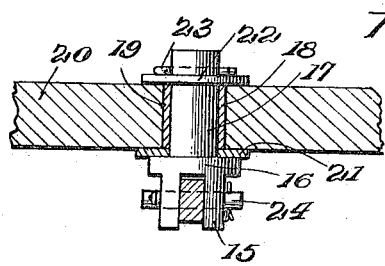
Fig. 5 is a detail vertical transverse sectional view taken substantially on the line 5—5 of Fig. 2.

In the drawings the body of the vehicle is indicated in general by the numeral 1 and the same is preferably formed of wood and is vertically disposed. An end piece 2 is secured to the rear end of the body 1 and extends transversely thereof and is provided at its lower corners with downward extensions 3 in which are journaled the spindles for the rear wheels. One of these wheels is indicated by the numeral 4 and the other by the numeral 5 and the said wheel 4 is suitably mounted upon a respective spindle 6 which is in turn mounted in the corresponding extension 3, this wheel being free to rotate in either direction independently of the wheel 5. The said wheel 5 is formed with a central opening 7 into which is fitted a bushing or thimble 8 having a flange 9 by which it is secured in place in the said wheel. The numeral 10 indicates a spindle which is permanently secured in any suitable manner within the thimble 9 so that in effect the wheel is fixedly mounted upon the end of the spindle 10. The spindle 10 is rotatably mounted within a bushing 11 fitted through the respective extension 3, and secured in any suitable manner upon the inner end of this spindle is a crank 12. A pin 13 is carried by or fitted through the outer end of the crank 12 and pivotally connects with the said crank the rear end of a pitman or connecting rod indicated by the numeral 14. This rod extends forwardly beside and in spaced relation to the right hand side of the body 1 and has its forward end fitted between spaced ears 15 formed at the lower end of a wrist pin 16 which is reduced as indicated by the numeral 17 and fitted through a bushing 18 which is disposed within an opening 19 formed in a foot operated member which is indicated in general by the numeral 20. Washers 21 and 22 are fitted onto the wrist pin and bear respectively against the under and upper faces of the said member 20, and a cotter pin or the like indicated by the numeral 23 is fitted through the projected upper end of this pin immediately above the said washer 22. A pivot pin 24 is fitted through the spaced ears 15 and through the said forward extremity of the connecting rod 14 and serves to pivotally connect these parts.

The foot operated member 20 is in the nature of a cross bar mounted for oscillatory movement upon a bolt or pin 25 at a point beneath the forward end of the body 1 of the vehicle, this member extending laterally beyond the opposite sides of the body so as to be engageable at its two ends by the child seated upon the seat of the vehicle, which seat is indicated by the numeral 26 and is secured in any suitable manner to the upper side of the body and to the upper side of the back piece 2. The foot operated member 20 is shouldered near each end as indicated by the numeral 27 so as to prevent slipping of the feet from the said member. In the oscillation of the member 20 reciprocatory motion will be imparted to the connecting rod or pitman 14 and thus the crank 12 will be rotated to impart rotary motion to the wheel 5 and thus cause the vehicle to be propelled over the ground surface.

In order that the vehicle may be steered, a steering post 28 is rotatably mounted vertically through the body 1 near the forward end thereof and is provided at its upper end with a transverse handle bar 29 and at its lower end with a yoke 30 in which latter is rotatably mounted a ground wheel 31.

From the foregoing description of the invention it will be seen that there is provided an extremely simple and yet durable and inexpensive propelling means for this type of vehicles, the propelling means being likewise simple in its operation and not liable to become disarranged or broken. Furthermore the arrangement is such that the operating member 20 may have motion imparted to it in the most convenient and least tiring manner. Of course, the vehicle may be propelled backwardly as well as forwardly and may be steered in any direction.

A foot rest 33 is preferably provided at the forward end of the body 1 in advance of the steering post 28 so as to permit of coasting.

Having thus described the invention, what is claimed as new is:

1. A child's vehicle comprising a body, wheels supporting the rear of the body, a seat upon the body, a steering post mounted upon the body in advance of the seat, a ground wheel carried by the steering post, one of the rear wheels having a spindle provided with a crank, a transverse oscillatory foot member mounted upon the body in advance of the steering post, a pin rotatably fitted through the said foot member, and a pitman pivotally connected with the pin and connected with the said crank.

2. A child's vehicle comprising a body, wheels supporting the rear of the body, a seat mounted upon the upper side of the body, a steering post mounted for turning movement through the body in advance of the seat, a ground wheel rotatably mounted at the lower end of the steering post, a transverse oscillatory foot member swiveled upon the under side of the body at the front thereof and in advance of the steering post, the said foot member projecting at its opposite end at opposite sides of the plane of the body, a pitman connected pivotally to the under side of the oscillatory foot member at one side of the body and extending rearwardly, and a crank element associated with one of the rear wheels of the body and to which the rear end of the pitman is connected.

3. A child's vehicle comprising a body disposed in a substantially vertical plane, a member secured transversely of the rear of the body, wheels journaled upon the said member and supporting the rear of the body, a seat secured upon the upper side of the member and upon the upper side of the body, a steering post rotatably mounted through the said body in advance of the seat, a ground wheel carried by the lower end of the steering post, an oscillatory foot member mounted upon the under side of the body at the front thereof and in advance of the steering post, a pin carried by the foot member and located at one side of the said body and spaced inwardly from the corresponding end of the foot member, a pitman connected to the lower end of the said pin, and a crank element associated with one of the rear wheels and to which the rear end of the pitman is connected.

In testimony whereof I affix my signature.

CALVIN C. WILLIAMS. [L. S.]